(12) United States Patent
Yang et al.

(10) Patent No.: US 7,719,521 B2
(45) Date of Patent: May 18, 2010

(54) NAVIGATIONAL INTERFACE PROVIDING AUXILIARY CHARACTER SUPPORT FOR MOBILE AND WEARABLE COMPUTERS

(75) Inventors: Sheng-Lung Yang, Taipei (TW); Yusuke Jinnai, Kawasaki (JP); Tetsurou Shimada, Kawasaki (JP)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 11/207,612

(22) Filed: Aug. 19, 2005

(65) Prior Publication Data

US 2007/0040811 A1   Feb. 22, 2007

(51) Int. Cl.
*G06F 3/02* (2006.01)
(52) U.S. Cl. .......................................... 345/171; 341/28
(58) Field of Classification Search ................ 345/171, 345/156, 173; 341/28
See application file for complete search history.

(56) References Cited

U.S. PATENT DOCUMENTS

| 6,160,536 | A  | * | 12/2000 | Forest ......................... 345/157 |
| 6,760,477 | B2 | * | 7/2004  | Ko ............................. 382/185 |
| 6,809,725 | B1 | * | 10/2004 | Zhang ......................... 345/171 |
| 6,925,611 | B2 |   | 8/2005  | SanGiovanni |
| 7,197,184 | B2 | * | 3/2007  | Repka ......................... 382/185 |
| 7,382,291 | B2 | * | 6/2008  | Chang et al. .................. 341/28 |
| 2002/0101458 | A1 | * | 8/2002 | SanGiovanni ............... 345/863 |
| 2003/0112224 | A1 | * | 6/2003 | Pan et al. .................... 345/171 |
| 2005/0057512 | A1 | * | 3/2005 | Du et al. ..................... 345/168 |

FOREIGN PATENT DOCUMENTS

| EP | 1542437 A2   | 6/2005 |
| JP | 11119904 A   | 4/1999 |
| JP | 2005092667 A | 4/2005 |
| WO | 2004063833 A2 | 7/2004 |

* cited by examiner

*Primary Examiner*—Amr Awad
*Assistant Examiner*—Liliana Cerullo
(74) *Attorney, Agent, or Firm*—Wolf, Greenfield & Sacks, P.C.

(57) ABSTRACT

A text input mechanism is provided especially for non-keyboard input devices for inputting text for languages that include large numbers of characters and that are not based on the Roman alphabets. Reading symbols of a language are presented to the user for selection. Reading symbols can be phonetic symbols for composing a pronunciation for a character in the language. Reading symbols can also be sub-characters that make up characters in the language. Upon a user specifying one or more reading symbols for a character, all characters in the language that match the specified reading symbols are dynamically identified and displayed to the user. The user can select the desired character from the displayed characters. The selected character is then entered into a computing system.

12 Claims, 10 Drawing Sheets

NAVIGATIONAL INTERFACE PROVIDING AUXILIARY CHARACTER SUPPORT FOR MOBILE AND WEARABLE COMPUTERS

BACKGROUND

As computers have become more complex, user interfaces have had to adapt to allow the user to control the operations of the computer. Initially, the interface used was a command line interface, which utilized a series of typed commands formatted in a specific syntax familiar to the computer and eventually learned by computer users. This interface was eventually replaced by the Graphical User Interface ("GUI"), which allows users to point to objects, buttons, and windows displayed like items on a desk. Initially, interaction between the GUI and a user was accomplished through a light pen, a pen-based computer control requiring the user to select and highlight objects on the screen by touching the light to the object on the screen. However, this implementation had its disadvantages because, by design, the user's hands and the light pen would obscure a portion of the screen from the user's own view. This and other disadvantages led to the development of the mouse, an interface control separate from the keyboard, that controlled a pointer on the GUI for selecting and highlighting objects, buttons, and windows.

The growth of the personal digital assistant ("PDA") and wearable computer markets are associated with similar problems realized in the larger-scale computing systems. As PDA technology continues to rapidly advance with respect to the size of PDA electronics and batteries, the size of handheld and mobile devices becomes more dependent upon the user interface utilized.

One of the current and practiced methods of interaction between a user and a PDA is a stylus-based GUI. In stylus-based interaction, the user holds the device in one hand and the stylus in the other. A stylus-based GUI enables a user to take full advantage of the PDA by allowing the user to navigate through applications operating on a computing system, control operations associated with those applications, and input text while using only one selection device—the stylus. In short, a separate keyboard or other input device is not needed.

While such interaction is similar to the use of a conventional pad and paper, it is not without problems. Since the stylus-based GUI is a simple derivation of the former light pen, it includes many of the same problems associated with the light pen-based GUI's. The use of a stylus obscures the portion of the display that the writing hand is covering. Further, the stylus-based GUI requires two-hand operation and typically requires the user to look at the device while using it. The stylus-based GUI must also include complex software to recognize the user's handwriting.

Another current and practiced method of interaction between a user and a PDA is the use of a numeric keypad, where each number key includes various letters of the Roman alphabet. Wireless and other similar devices also used such numeric keypads to allow a user to interact with the devices. The design of the numeric keypad allows a user to input text and/or numbers to initiate some operational element of the PDA. The use of the numeric keypad generally requires the user to use one hand to accomplish the interaction, which is advantageous over the stylus-based interaction method.

Unfortunately, the current and practiced method of interaction using a numeric keypad does not function with languages that are not based upon the Roman alphabet. In particular, the English language is generally written using an alphabet of twenty-six letters derived from the Romans. Other written languages, however, may employ significantly greater numbers of written characters. An example of a written language that requires a relatively large number of written characters is the Chinese language. Chinese has a constrained phonetic structure. In spoken Chinese, there are only 412 basic phonetic units, each unit having a monosyllabic sound. Four sound patterns can potentially be applied to each phonetic unit, resulting in slightly more than 1,000 distinct sounds. Other languages not based on the Roman alphabet also include a vast number of characters, and may also employ the use of monosyllabic sounds. Put simply, current numeric keypads are not capable of handling the large number of written characters of those languages that use a non-Roman based lettering system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention addresses the above-identified deficiencies of current non-keyboard input devices by providing a mechanism that enables non-keyboard input devices to input text of any language into a computing system, including Roman based language and non-Roman based language.

In accordance with one aspect of the invention, a navigational interface is provided. The navigational interface includes an input device that is capable of generating a selection stroke when operated by a user. Such an input device can be a cellular phone, a PDA, or any mobile or wearable device. The navigational interface further includes a sensor pattern containing multiple sensory portions. The sensory portions include a central sensory portion and a plurality of petals sensory portions. A selection strike starting with the central sensory portion initiates text input. An information element associated with text for a language such as language symbols or characters, is referenced by one of the plurality of petal sensory portions. The navigational interface may also include an input interpretation module for interpreting a selection stroke generated from the input device against the sensor pattern so to identify at least one sensory portion included in the selection stroke. The navigational interface may further include a display that maps to the sensor pattern. For example, the display may include a plurality of petal display portions, each of which presents one or more information elements referenced by each of the petal sensory portions of the sensor pattern.

More importantly, the navigational interface includes a text-mode operations module for inputting text into the computing system. The module first determines the language to be used for inputting text into the computing system. The module then displays all reading symbols for the language. The reading symbols can be phonetic symbols for composing pronunciations for characters in the language. The reading symbols can also be sub-characters used to compose characters in the language. A user can select one or more of the reading symbols to compose the desired character. Upon receiving such selections, the text-mode operations module identifies one or more characters in the language that match the one or more selections of the reading symbols. Such characters are dynamically generated according to the selected reading symbols. Such characters may be included in a character candidate list. The text-mode operations module then displays these characters. A user may select the desired characters from the displayed characters. The modules then input the character into the computing system. Aspects of invention also include a method and/or computer-readable medium containing computer-executable instructions implementing features included in the described text-mode operations module.

As a result, the invention enables a non-keyboard input device to accept non-Roman language input. A non-keyboard input device is thus not limited by the limited number of input keys in its numeric keypad, for example. The use of reading symbols enables a user to compose text input in a language that includes large numbers of written characters and is not based on the Roman alphabets.

DRAWINGS

The foregoing aspects and many of the attendant advantages of exemplary embodiments of the present invention will become more readily appreciated as the same become better understood by reference to the following detailed description, when taken in conjunction with the accompanying drawings, wherein.

DETAILED DESCRIPTION

Figure 1:
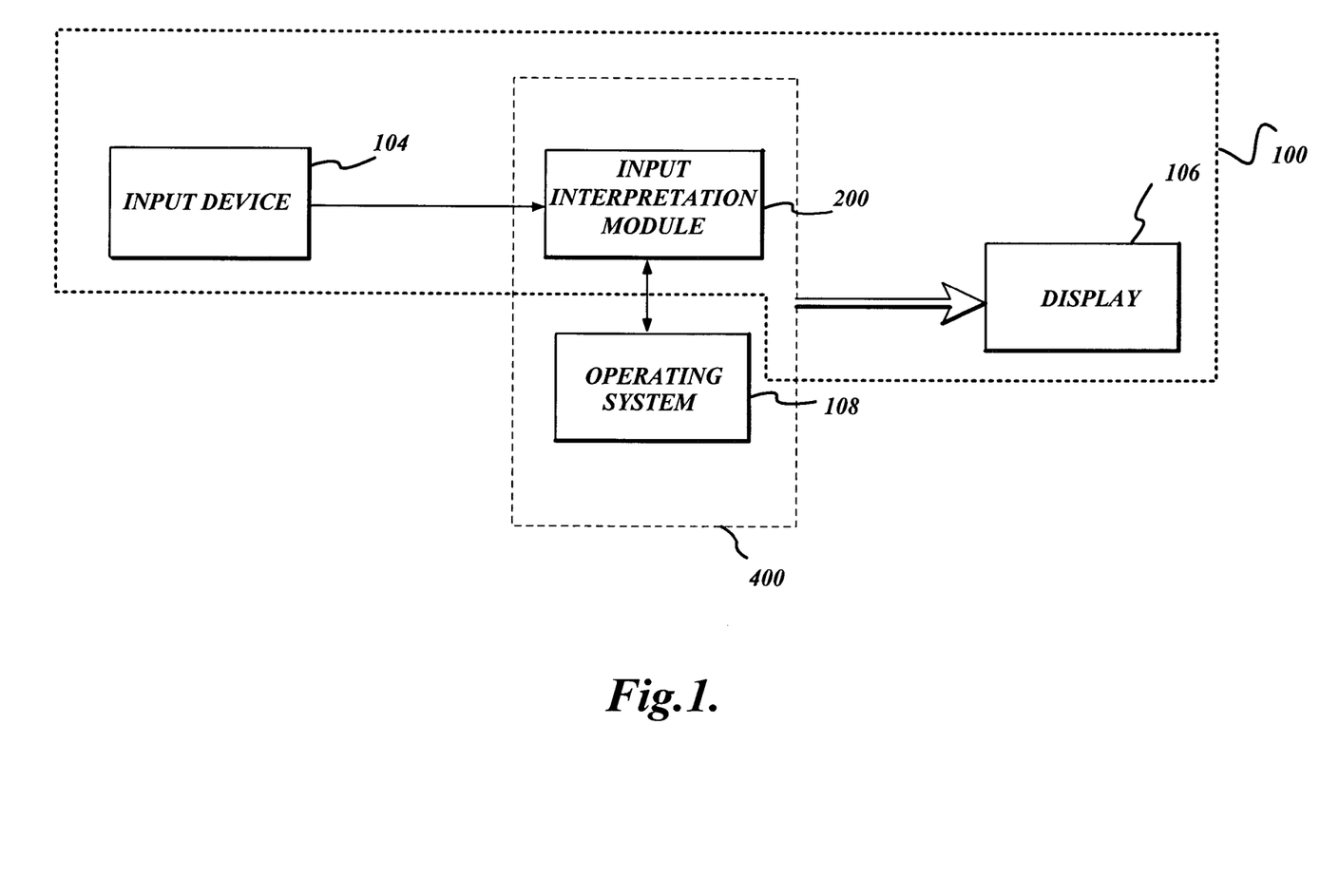
FIG. 1 is a block diagram illustrating an exemplary navigational interface and its interaction with a computing system.

FIG. 1 illustrates an exemplary navigational interface 100. The navigational interface 100 includes an input device 104 and an input interpretation module 200 that interprets input from the input device 104. The navigational interface 100 further includes a display 106. The display 106 presents a navigational display, i.e., a display pattern illustrating information elements, such as text and/or commands, of the navigational interface 100. Interaction between a user and the navigational interface 100 is accomplished through interactions between the input device 104, the input interpretation module 200, and the navigational display presented on the display 106. In accordance with one embodiment, the navigational interface 100 may be part of a computing system 400. The computing system 400 includes an operating system 108, which may be used to execute tasks generated by the input interpretation module 200. The computing system 400 is operably connected to the display 106.

Figure 2:
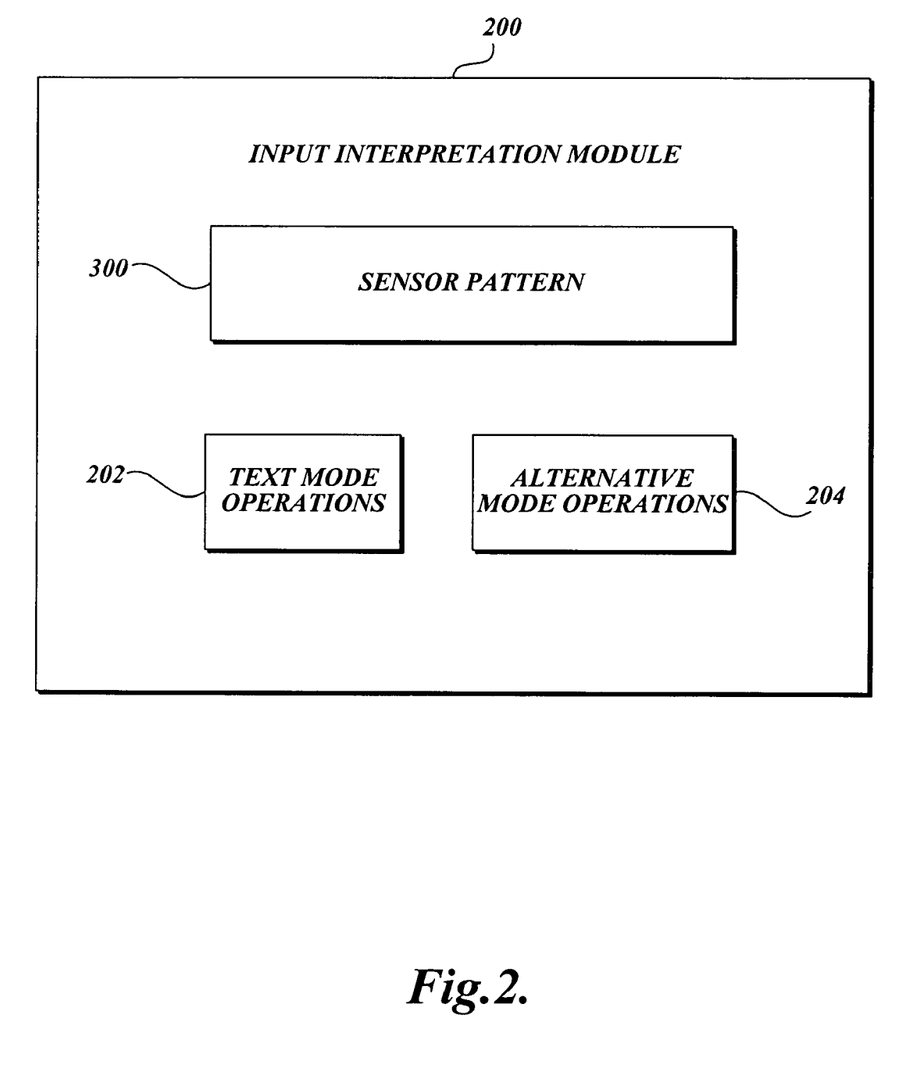
FIG. 2 is a block diagram illustrating exemplary components included in an input interpretation module, a conceptual component of a navigational interface.

FIG. 2 is a block diagram illustrating an exemplary implementation of the input interpretation module 200. The input interpretation module 200 includes a sensor pattern 300 and a text-mode operations module 202. The input interpretation module 200 may also include one or more modules 204 for alternative-mode operations, such as control mode operations that accept input to operate applications in the computing system 400.

Figure 3:
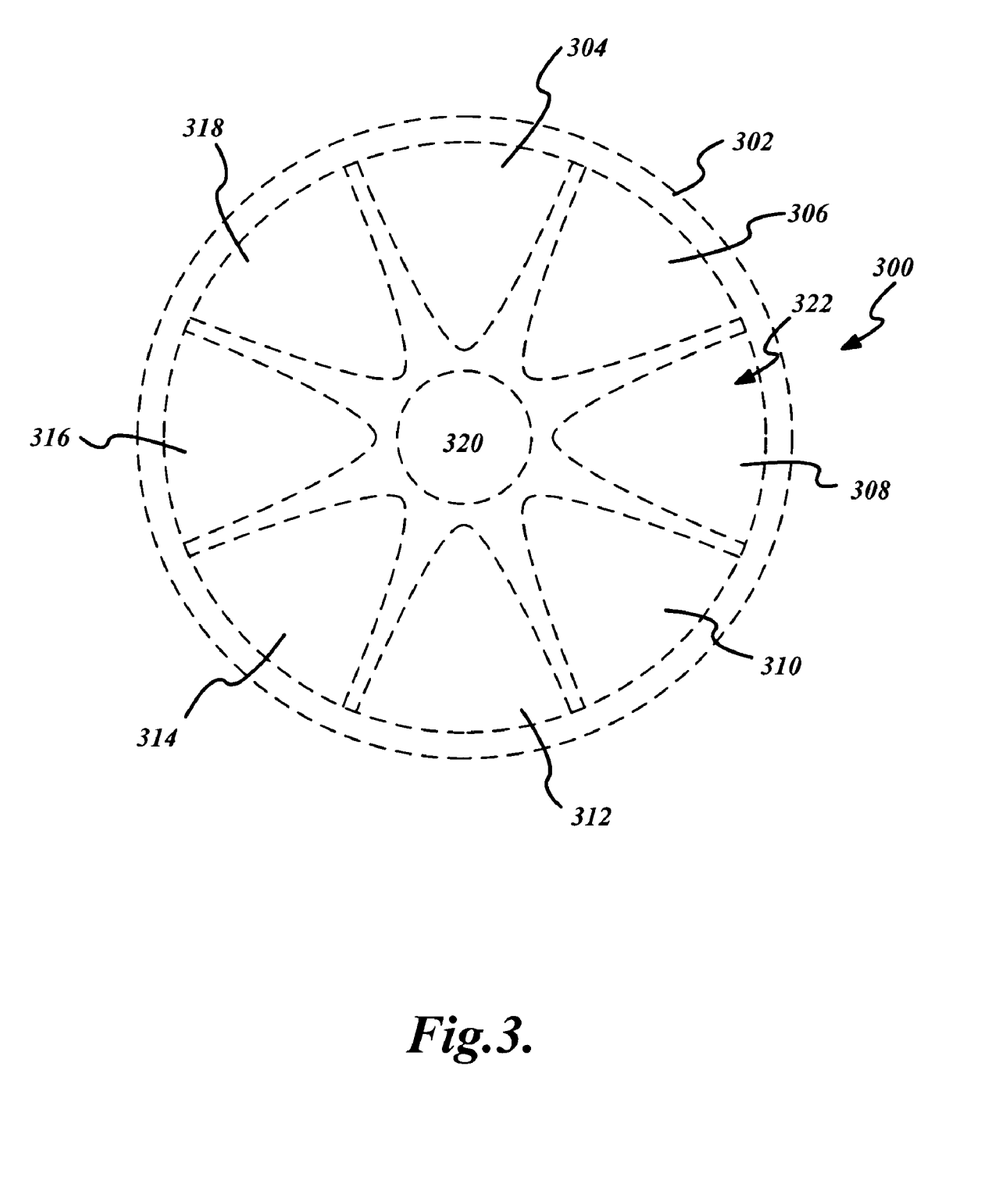
FIG. 3 is a pictorial diagram illustrating an exemplary sensor pattern included in an input interpretation module in accordance with an embodiment of the present invention.

FIG. 3 illustrates an exemplary implementation of the sensor pattern 300 in accordance with an embodiment of the present invention. The sensor pattern 300 is radially divided into a central sensory portion 320 and a petals sensory portion 322. The petals sensory portion 322 is angularly divided into a predetermined number of graphical sensory petals 304-318. In one embodiment, the petals sensory portion 322 contains eight sensory petals 304-318. In other embodiments, the petals sensory portion 322 might contain any number of sensory petals 304-318. The sensor pattern 300 may also include an outer sensory, or circumferential, portion 302, which may be located on the outermost edge of the sensor pattern 300. In accordance with an embodiment, the central sensory portion 320 and the circumferential portion 302 are not angularly divided by the sensory petals 304-318. In other embodiments, the central sensory portion 320 and the circumferential portion 302 might be divided by the sensory petals 304-318.

In exemplary embodiments of the invention, the input interpretation module 200 interprets input information contained in a selection stroke that is generated by the input device 104 and is relative to the sensor pattern 300. The input interpretation module 200 may be designed with either software or logic. In one embodiment, the interpretation of a selection stroke relative to the sensor pattern 300 is maintained internal to the input interpretation module 200. In another embodiment, the interpretation of a selection stroke might be a separate module located on a connection between the input device 104 and the input interpretation module 200.

In embodiments of the invention, the input device 104 is used to detect input strokes, which are recognized by the input interpretation module 200 as selection strokes relative to the sensor pattern 300. In one embodiment, the input device 104 is a touchpad having sensors for detecting touch by the user at different positions on the touchpad. The sensors are located on positions of the touchpad corresponding to the portions 302-320 of the sensor pattern 300. In this embodiment, an input stroke is performed by the user touching and lifting his finger on sensory portions of the touchpad. Other sensory pattern devices might be a mouse, a joystick, a touch screen, or any other device that can detect input strokes. When an input stroke is performed on the input device 104, the input interpretation module 200 detects the positions included in the input stroke and the corresponding portions 302-320 on the sensor pattern 300.

The selection stroke relative to the sensory pattern 300 mirrors the input stroke on the touchpad. If the user touches the touchpad on one position and immediately lifts without continuing to any other position on the touchpad, then the selection stroke is a press/click stroke. If the user touches the pad on one position and continues, or slides, to at least one other position on the touchpad, then the selection stroke, depending on the location of the other position(s), might be a drag-in, a drag-out, a dial, or an out-return stroke. The same selection strokes may be generated with a mouse and a mouse button or a joystick and a button. The position of a pointer during a selection stroke may be indicated by a cursor on a display such as the display 106 that displays the sensory pattern 300. Alternatively, the sensory pattern 300 might overlay the sensory portions 302-320 on a touchpad or touch screen. In one embodiment, the sensors of the touchpad are arranged in a pattern identical to the sensory pattern 300. In other embodiments, other sensory patterns might be used, but there should be an intuitive relationship between the input device 104 and the sensory pattern 300 detecting the selection strokes relative to the sensory pattern 300. While a number of embodiments have been described for the input device 104, any number of combinations of pads, keys, buttons, and posts might be selected as an input device 104 to the navigational interface 100.

In accordance with one embodiment of the present invention, a selection signal is transmitted from the input device 104 to the input interpretation module 200 when the user inputs an input stroke using the sensor pattern 300. Input stroke information in the selection signal identifies a selection stroke selecting specific portions 302-320 of the sensor pattern 300. Each of the portions 302-320 references one information element associated with a task—text entry or control—to be performed in the computing system 400. In accordance with one embodiment, a single information element is the only information element associated with a particular task. In other embodiments, a group of information elements might be associated with one particular task. In this embodiment, selection of all the information elements associated with the task requests performance of the task. In accordance with an embodiment, a task is a command to be implemented in the computing system 400. In accordance with various embodiments, the task might be executed by the operating system 108, the application program calling the operation, the user interface through which the application is operating, or the navigational interface 100. In particular, each information element, when selected, requests performance of a particular task by one of the various embodiments. Additionally and in other embodiments, the information element, which is controlled by the input interpretation module 200, might independently provide for the execution of the particular task. A selection stroke triggers operation of the input interpretation module 200 to perform the task associated with the information element or group of elements selected.

In one embodiment, the navigational interface 100 is used in conjunction with a graphical user interface (GUI), such as Windows® CE from Microsoft Corporation. In this embodiment, the user controls operations of the computing system 400 and inputs/edits text into various applications running on the computing system 400 through the navigational interface 100 activated as part of the GUI. In another embodiment, the navigational interface 100 is the only user interface operating on the computing system 400.

Regardless of whether the navigational interface 100 is used in conjunction with another GUI or solely as the user interface on the computing system 400, in one embodiment of the present invention, all tasks, including, but not limited to, text inputting/editing and control of computer operations, are accomplished through the input device 104. In other embodiments, the user might use a plurality of input devices. In either embodiment, the user controls operations of the computing system 400 and inputs/edits text into various applications running on the computing system 400 by performing input strokes on certain portions 302-320 of the sensor pattern 300. The input strokes are recognized by the navigational interface 100 as selection strokes on the sensor pattern 300. As described earlier, a selection stroke identifies certain tasks—text entry or control—to be implemented in the computing system 400.

In accordance with one embodiment, a user interacts with the navigational interface 100 through the input device 104 to control computer operations and input text. A display 106 provides visual feedback to the user of operations performed using the navigational interface 100.

Figure 4:
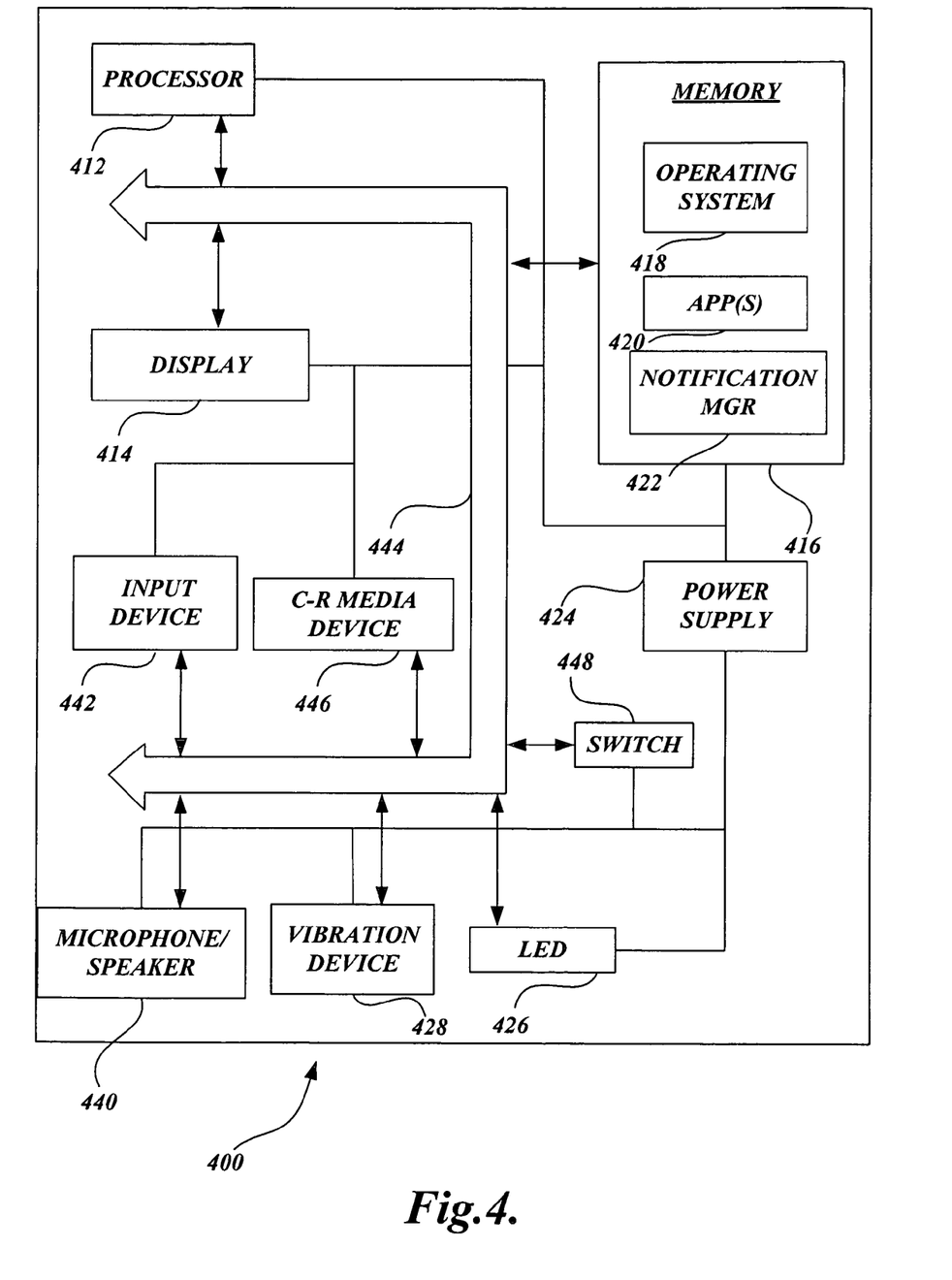
FIG. 4 is a block diagram illustrates an exemplary operating environment in which embodiments of the invention may be implemented.

FIG. 4 illustrates an example of the exemplary computing system 400 in which embodiments of the invention may be implemented. The computing system 400 is only one example of a suitable operating environment and is not intended to suggest any limitation as to the scope of use or functionality of the present invention. Other well-known computing systems, environments, and/or configurations that may be suitable for use with the present invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like. FIG. 4 shows functional components of the exemplary computing system 400. In exemplary embodiments of the invention, the computing system may be small computing devices, such as cellular phones, personal digital assistants, or other wearable computer devices. Various small computing devices may have all or some of the components illustrated in FIG. 4.

As shown in FIG. 4, the computing system 400 may include a processor 412, a memory 416, and an input device 442 (such as the input device 104).

The memory 416 generally includes both volatile memory (e.g., RAM) and non-volatile memory (e.g., ROM, PCMCIA cards, etc.). An operating system 418 (such as the operating system 108) is resident in the memory 416 and executes on the processor 412. The operating system 418 may be the Windows® CE operating system from Microsoft Corporation or other operating systems, including device-specific operating systems for small computing devices.

One or more application programs 420 may be loaded into the memory 416 and run on the operating system 418. Examples of applications include telephony programs, e-mail programs, scheduling programs, PIM (personal information management) programs, word processing programs, spreadsheet programs, Internet browser programs, and so forth. The computing system 400 may also have a notification manager 422 loaded in the memory 416. The notification manager 422 handles notification requests from the applications 420.

The computing system 400 handles a power supply 424 which may be implemented as one or more batteries. The power supply 424 might further include an external power source that overrides or recharges the batteries included in the device. The external power source might include an AC adapter or a powered docking cradle.

The computing system 400 may also include external notification devices and a microphone/speaker 440. The illustrated external notification devices include an LED 426 and a vibration device 428. In addition, the speaker in the microphone/speaker 430 may be used to provide audio notification. The notification devices are directly coupled to the power supply 424 so that, when activated, they remain on for a duration dictated by the notification mechanism. A switch 448 may be provided and be controlled by the processor 412 to shut off power to conserve energy.

The computing system 400 typically includes at least some form of computer-readable media. Computer-readable media can be any available media that can be accessed by the computing system 400. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 400. Communication media typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Figure 5:
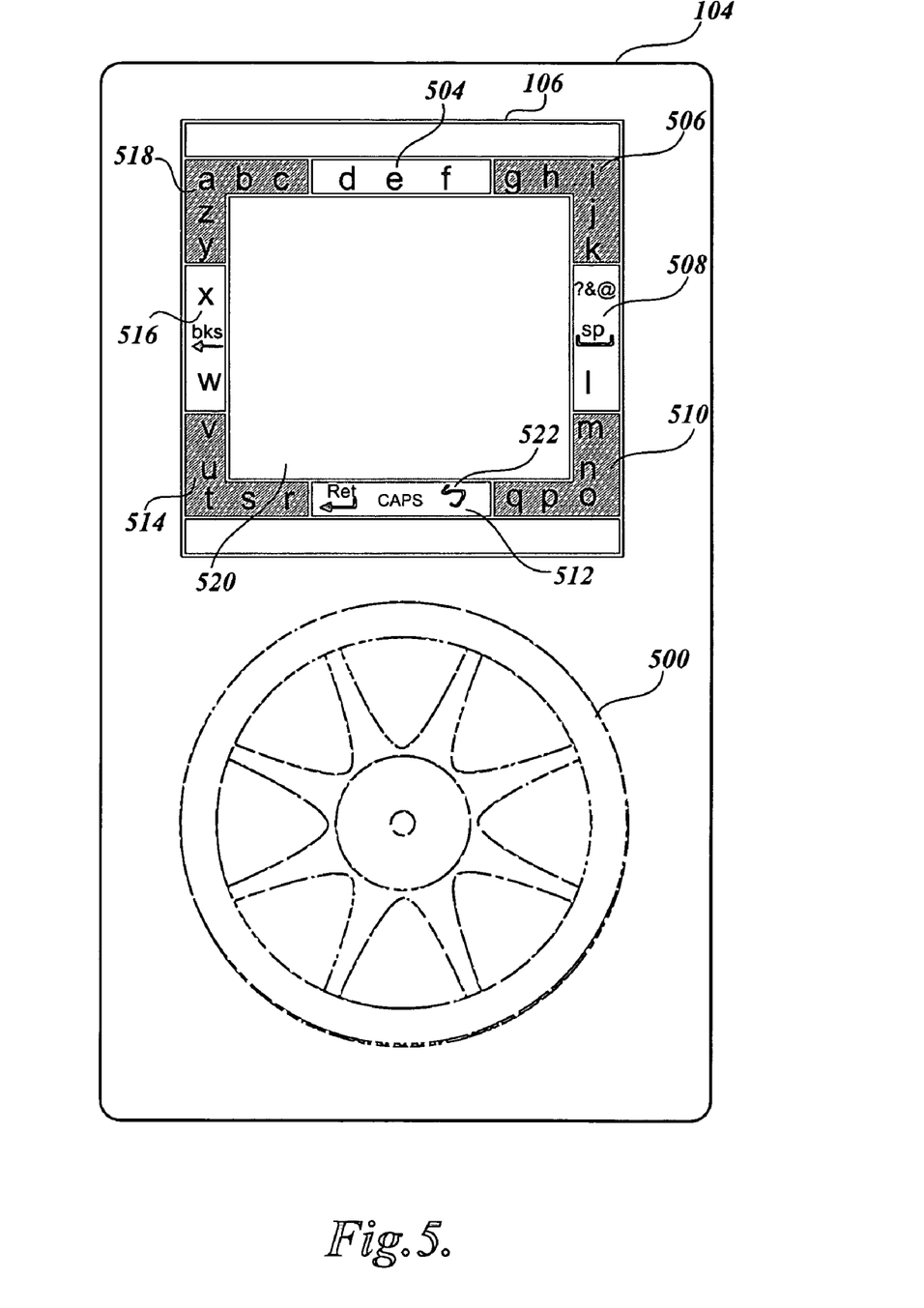
FIG. 5 is a block diagram illustrating an exemplary user interface of a non-keyboard input device, wherein the user interface is in English language.

Thus, the input device 104 is capable of accepting from a user text input for the computing system 400. As noted above in the Background section, a Roman-based lettering system such as the English language uses a limited number of letters to generate words in the language. Therefore, the input device 104 may distribute the limited number of letters relative to the sensor pattern 300. For example, FIG. 5 illustrates an exemplary input device 104 that maps the twenty-six letters for English language relative to the sensor pattern 300. The input device 104 includes an exemplary input pad 500, through which text and/or other information can be input for the computing system 400. As indicated in FIG. 5, the layout of the input pad 500 mirrors the sensor pattern 300. The input device 104 may also include the display 106, which includes petals display portions 504-518 and a central screen 520. The petals display portions 504-518 may be used to display, respectively, information elements, such as text or controls, mapped to the sensory petals 304-318 of the sensory pattern 300. For example, as shown in FIG. 5, the petals display portions 504-510, 514-518 display the twenty-six letters used to compose English words. As shown later in FIG. 8, the petals display portions 504-518 may also be used to display feedback from the computing system 400. The central screen 520 of the display 106 may be used to display user input and/or feedback from the computing system 400.

As described above in the Background section of the patent application, the English language is a Roman-based lettering system. Non-Roman based lettering systems such as the traditional Chinese language may employ significantly greater numbers of written characters. Generally, each of such characters may be composed by a sequence of reading symbols. A reading symbol is a specific symbol that is used to compose a character. For example, in traditional Chinese, a reading symbol can be a phonetic symbol that is used to compose the pronunciation of a Chinese character. A specific sequence of phonetic symbols generates a pronunciation. Because multiple Chinese characters may have the same pronunciation, a user is required to select the desired character from the multiple characters that match the pronunciation. Alternatively, a reading symbol can be one of the sub-characters that make up a character. The selection of a specific sequence of sub-characters can generate one or more matching characters. A user thus may also be required to select the desired character from the matching characters.

Embodiments of the invention support text input for non-Roman languages on non-keyboard input devices such as the input device 104 by providing a text input mechanism, which may be implemented by the text-mode operations module. In exemplary embodiments of the invention, the text input mechanism includes two phases: a reading phase and a selection phase. In the reading phase, a user selects the specific sequence of reading symbols that make up a character in the language. The display 106 of the input device 104 may display consecutively different sets of reading symbols for a user to select. In the selection phase, a dynamically generated candidate list including all the characters in the language that match the selected reading symbols will be displayed to the user. A user may then select the desired character from the candidate list.

In embodiments of the invention, the input device 104 may support multiple languages, including Roman-based languages and/or non-Roman based languages. For example, the input device 104 illustrated in FIG. 5 supports at least the English language and the traditional Chinese language. Upon a user selecting the traditional Chinese character 522 shown in the petals display portion 512, the input device 104 is switched from the English input mode to the traditional Chinese input mode.

Figure 6:
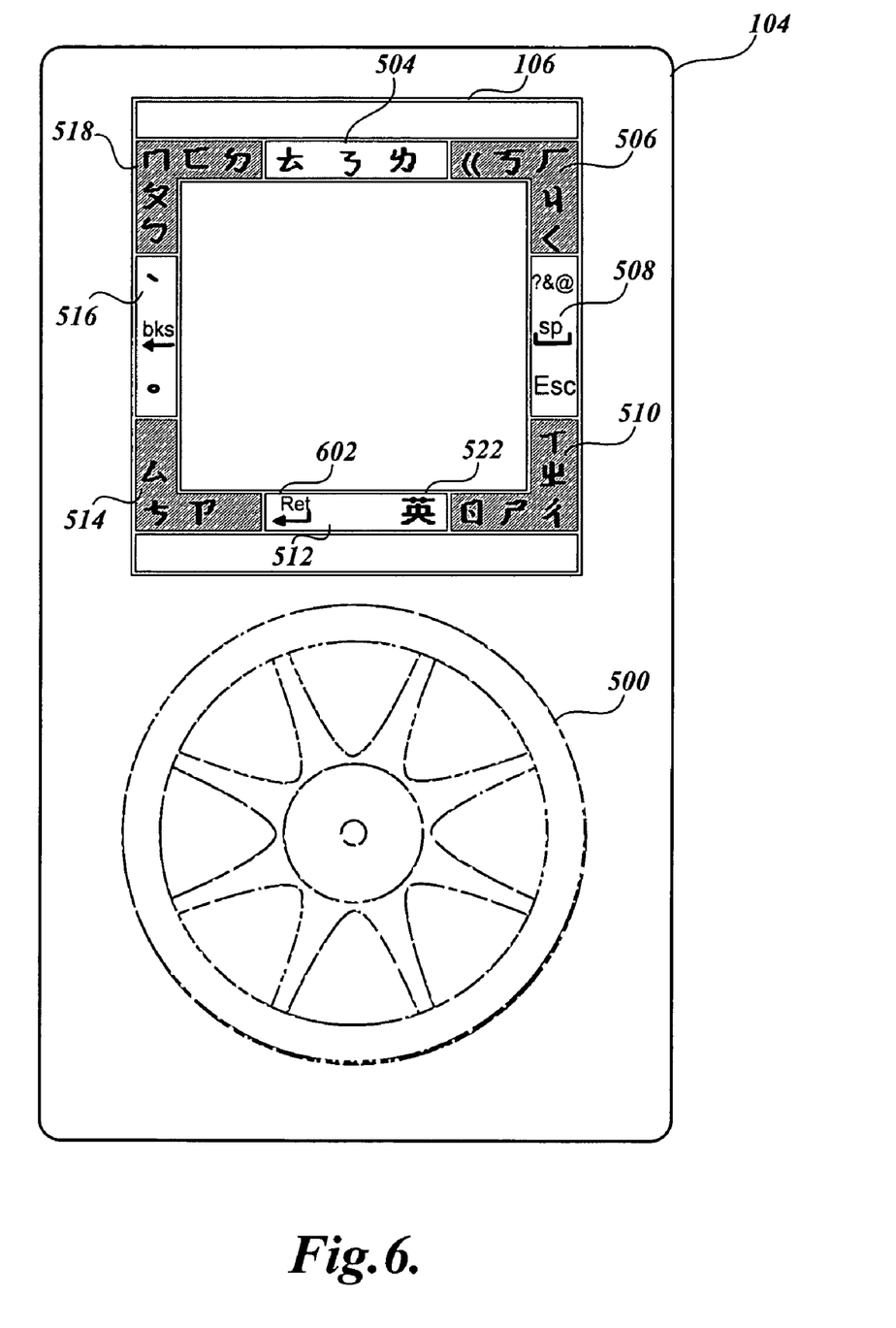
FIG. 6 is a block diagram illustrating an exemplary user interface for a non-keyboard input device, wherein the user interface displays a reading phase screen for traditional Chinese text input, wherein the screen displays all consonants for traditional Chinese language.
Figure 7:
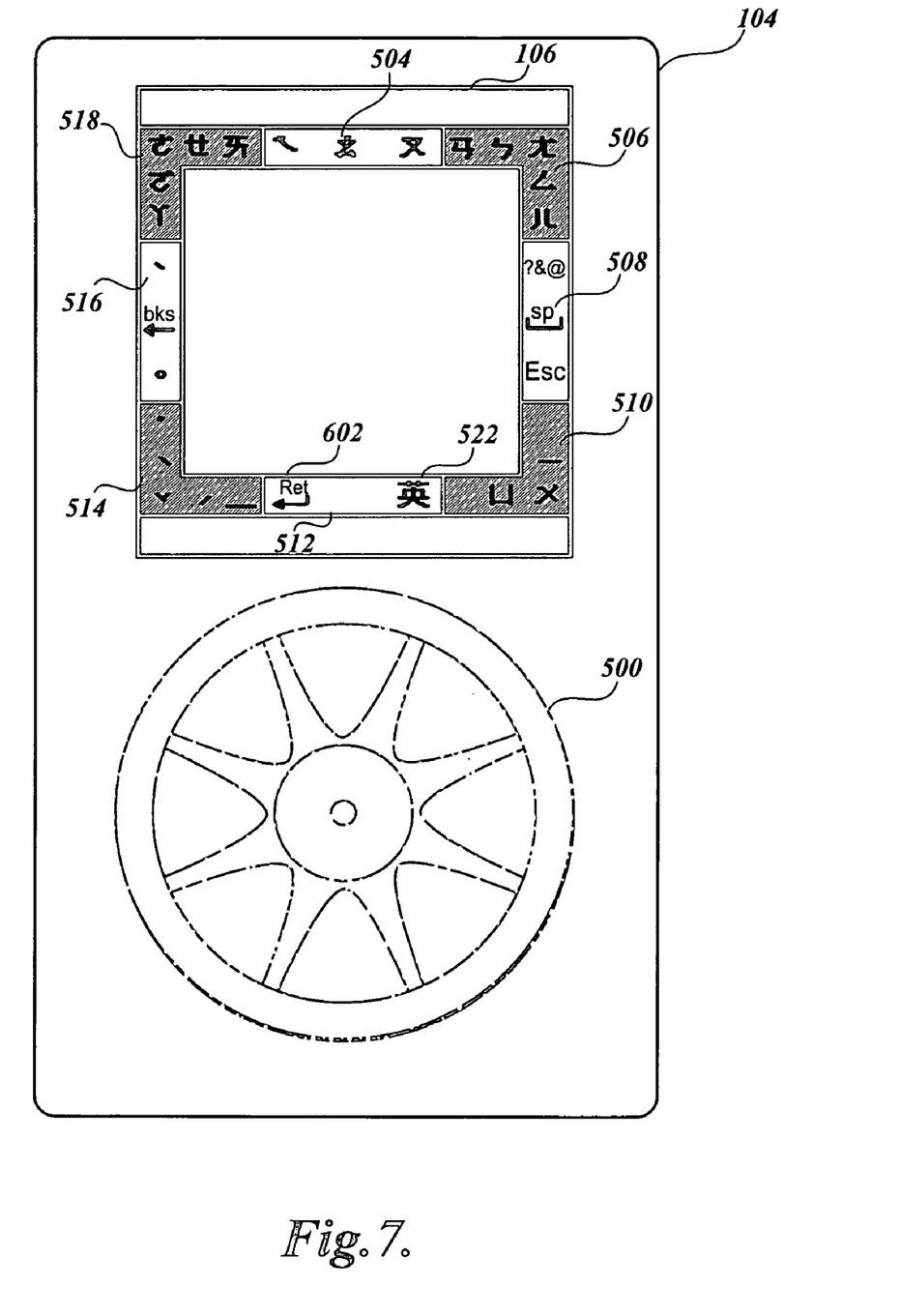
FIG. 7 is a block diagram illustrating an exemplary user interface for a non-keyboard input device, wherein the user interface illustrates another reading phase screen for traditional Chinese text input, wherein the screen displays all vowels and tones for traditional Chinese language.
Figure 8:
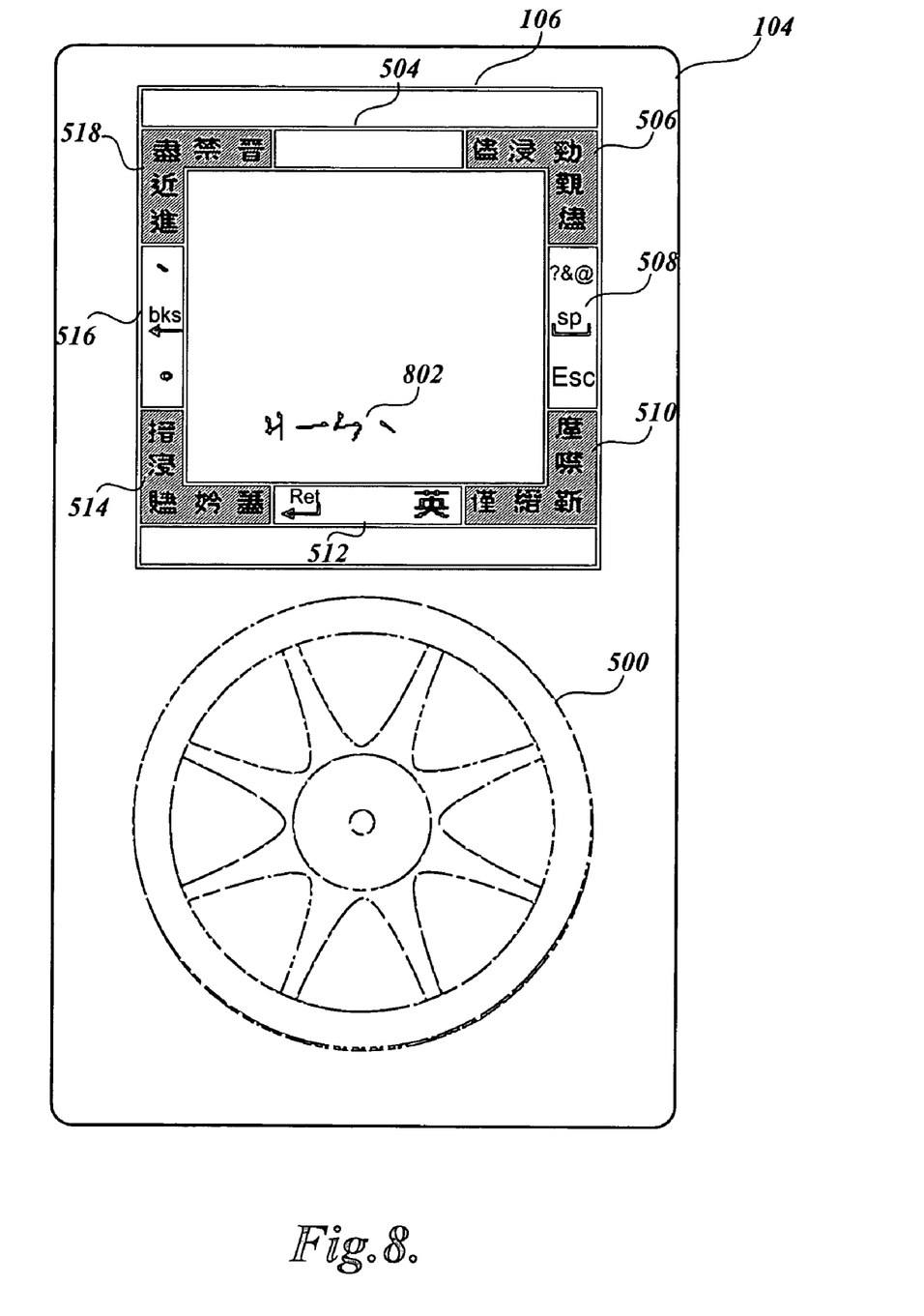
FIG. 8 is a block diagram illustrating an exemplary user interface of a non-keyboard input device, wherein the user interface displays a selection phase screen for traditional Chinese text input, wherein the screen displays a dynamically generated candidate list containing traditional Chinese characters matching selected reading symbols.

FIGS. 6-8 illustrate the reading phase and the selection phase for inputting a traditional Chinese character. In traditional Chinese, the reading sequence of a character can be composed phonetically by 0 or 1 consonant, 0-2 vowels, and a tone. Thus, in an exemplary embodiment of the invention, when inputting traditional Chinese text, a user needs to first specify whether the desired character contains any consonant, and if yes, what consonant. The user then needs to specify whether there is any vowel in the pronunciation of the character, and if yes, what the vowels are. The user finally needs to specify the tone for the character. According to the pronunciation specified by the user, a character candidate list including all traditional Chinese characters matching the specified pronunciation will be dynamically generated and displayed to the user for selection.

Specifically, FIG. 6 illustrates all consonants available for traditional Chinese pronunciation. The petals display portions 504, 506, 510, 514, and 518 of the display 106 list all the consonants available for traditional Chinese language. The petals display portions 508, 512, and 516 include different punctuations and text input controls such as spacing, escape, return, and backspacing. A user may select none or one of the consonants displayed in FIG. 6 before hitting the return control 602 in the petals display portion 512. The display 106 then displays the vowels and the tones available for traditional Chinese language. FIG. 7 illustrates an exemplary display of all available vowels and tones for the traditional Chinese language. The petals display portions 504, 506, 510, and 518 of the display 106 present all the available vowels. The petals display portion 514 displays the available tones.

In an exemplary embodiment of the invention, when a user selects one of the tones displayed in the petals display portion 514, the computing system 400 concludes that the user has completed the input for the pronunciation of the desired character. The computing system 400 proceeds to dynamically generate a candidate list including all traditional Chinese characters that match the specified pronunciation. FIG. 8 illustrates the display 106 presenting all traditional Chinese characters matching the pronunciation 802 that has been specified by the user. The user then selects the desired character from the list. The character then is entered into the computing system 400.

Figure 9:
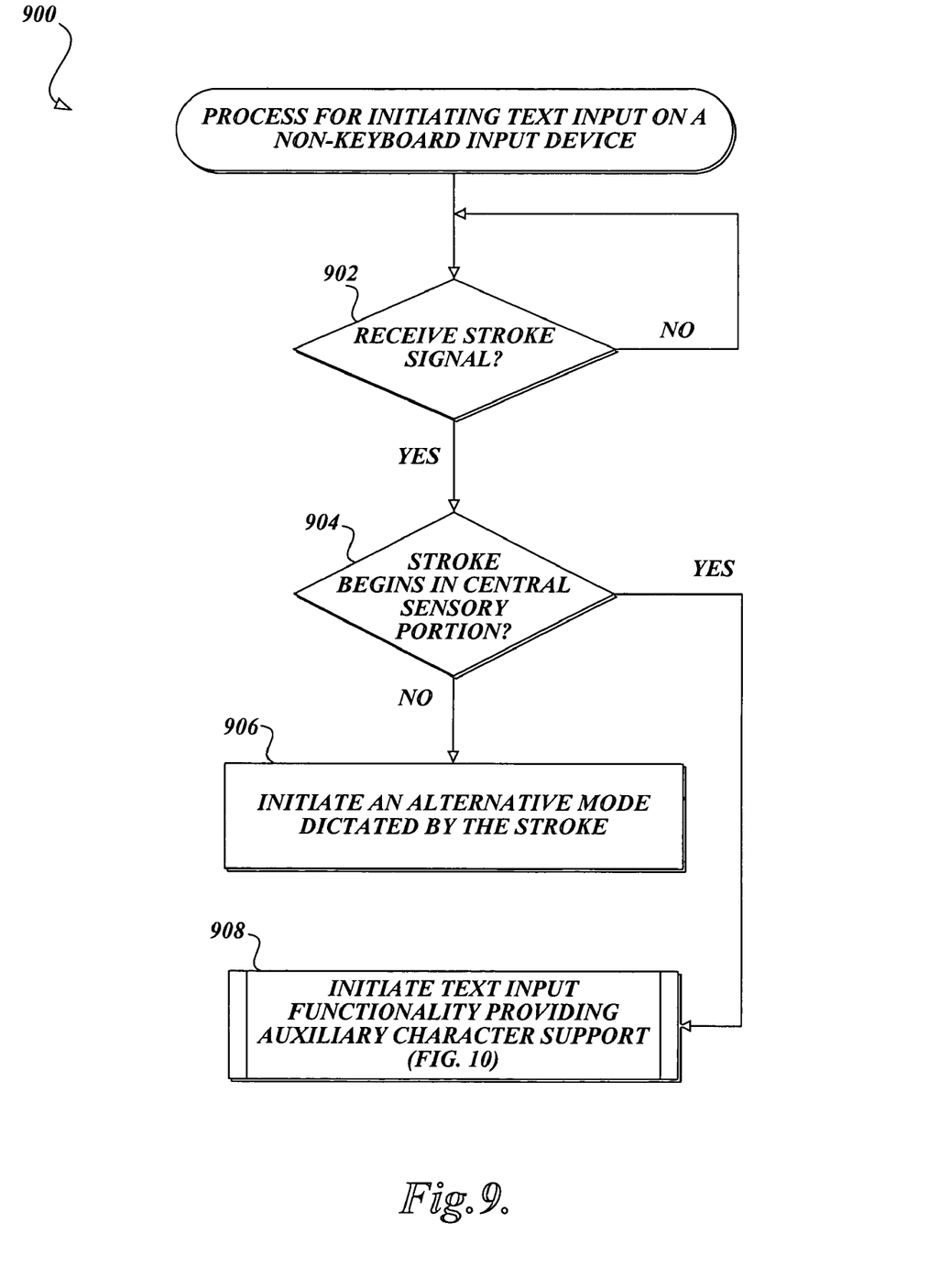
FIG. 9 is a flow diagram illustrating an exemplary process for initiating text input on a non-keyboard input device.
Figure 10:
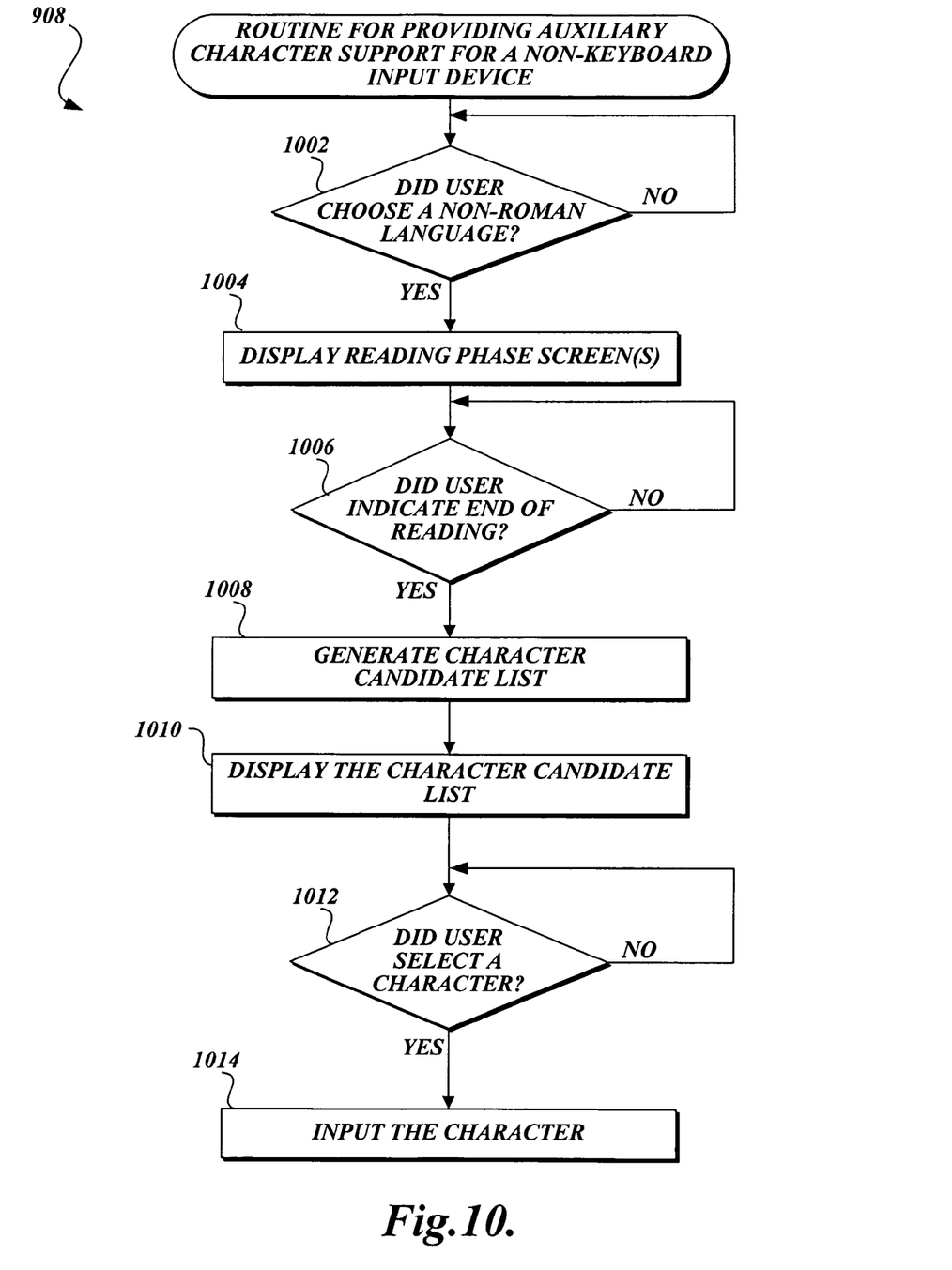
FIG. 10 is a flow diagram illustrating an exemplary routine for inputting non-Roman language text using a non-keyboard input device, suitable for use in FIG. 9.

FIG. 9 is a flow diagram illustrating an exemplary process 900 for initiating text input on a non-keyboard input device such as the input device 104. The process 900 first determines whether it receives a stroke signal from the input device. See decision block 902. If the answer is NO, the process 900 does not proceed further. If the answer to the decision block 902 is YES, the process 900 determines whether the stroke begins in the central sensory portion of the sensor pattern such as the central sensory portion 320 in the sensory pattern 300. See decision block 904. If the answer to decision block 904 is YES, the process 900 executes a routine 908 which initiates a text input mode for the input device. FIG. 10 illustrates an exemplary routine 908 and will be described in detail shortly. If the answer to the decision block 904 is NO, the process 900 initiates alternative-mode operations for the input device. See block 906. An alternative mode may regard input strokes from the input device as instructions to control operations of a computing system such as the computing system 400 or to operate applications in the computing system.

As noted above, FIG. 10 is a flow diagram illustrating an exemplary routine 908 for providing auxiliary character support for a non-keyboard input device. The routine 908 starts by determining whether a user has chosen a non-Roman language as the input language. See decision block 1002. As noted above, a non-Roman language is a language that does not use the limited Roman alphabets to compose its characters. One or more reading symbols may be specified to compose a reading of the character. Such reading symbols can be, for example, phonetic symbols used to compose a pronunciation of the character, or sub-characters used to compose the character. A reading of a character may be matched by more than one character in the language. Therefore, the user may be asked to select the desired character from the matching characters.

The routine 908 proceeds to display one or more reading phase screens if the answer to decision block 1002 is YES. See block 1004. Depending on the character of the language, the routine 908 may display one or multiple screens during the reading phase. During the reading phase, the user specifies all the reading symbols that are used to compose the character or the pronunciation of the character. For example, as illustrated in FIGS. 6-7, to identify a traditional Chinese character through pronunciation, a user needs to specify any consonant, one or more vowels, and a tone for the pronunciation in two different reading phase screens. The routine 908 then proceeds to determine whether the user has indicated the end of a reading for the character. See decision block 1006. The end of a reading for a character can be indicated, for example, by the user selecting a particular symbol. For example, as illustrated in FIG. 7, the reading of a traditional Chinese character's pronunciation completes once the user selects a tone for the pronunciation. If the answer to the decision block 1006 is NO, the routine 908 does not proceed further. If the answer to the decision block 1006 is YES, the routine 908 proceeds to generate a character candidate list including all characters in the language that match the reading specified by the user. See block 1008. The routine 908 then displays the character candidate list to the user. See block 1010. The routine 908 then proceeds to determine whether the user has selected a character from the character candidate list. See decision block 1012. If the user did not select a character, the routine 908 does not proceed further. If the answer to decision block 1012 is YES, meaning the user has identified the desired character from the character candidate list, the routine 908 proceeds to input the character into the computing system. See block 1014. Preferably, the routine 908 displays the character to the user as well. In an exemplary embodiment of the invention, the routine 908 may be implemented by the text-mode operations module 202 illustrated in FIG. 2.

The logical operations of the various embodiments of the present invention may be implemented (1) as a sequence of computer-implemented acts or program modules running on a computing system, and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts, and modules may be implemented in software, in firmware, in special purpose digital logic, and any combination thereof, without deviating from the spirit and scope of the present invention as recited within the claims attached hereto.

The embodiments of the invention in which an exclusive property or privilege is claimed are defined as follows:

1. In a computing system, a method for inputting text to the computing system through a navigational interface including an input device, the method comprising:
   receiving a selection stroke that begins on a central sensory portion of a sensor pattern of the navigational interface containing multiple sensory portions including the central sensory portion and a plurality of petal sensory portions;
   displaying on a display reading symbols for a language, wherein the display comprises a central area and a periphery surrounding the central area, the periphery comprising a plurality of information elements each referencing a petal sensory portion of the plurality of petal sensory portions, the displaying comprising:
      displaying consonants on the periphery;
      after the consonants are displayed on the periphery and a user input is provided indicating that selection by a user of a consonant from the consonants is completed, displaying vowels and tones on the periphery by replacing the consonants with the vowels and tones; and
      after the vowels and tones are displayed on the periphery and a user input is provided indicating that selection by the user of at least one vowel of the vowels and a tone of the tones is completed, displaying one or more candidate characters in the language based on the selected tone and the selected consonant and the selected at least one vowel; and
   receiving one or more selection strokes selecting one or more of the reading symbols and the tone, comprising:
      receiving at least one selection stroke of the one or more selection strokes selecting the consonant of the consonants;
      while the consonants on the periphery are replaced with the vowels and tones, receiving at least one selection stroke of the one or more selection strokes selecting the at least one vowel of the vowels, and receiving a selection stroke of the one or more selection strokes selecting the tone of the tones; and
      while the vowels and tones on the periphery are replaced with the one or more candidate characters in the language generated based on the selected tone and the selected one or more of the reading symbols, receiving a character selection stroke selecting a character from the one or more candidate characters.

2. The method of claim 1, further comprising:
   upon receiving the character selection stroke, inputting the character to the computing system.

3. The method of claim 1, wherein the one or more of the reading symbols include phonetic symbols for the language.

4. The method of claim 1, wherein the one or more of the reading symbols include sub-characters used for composing characters in the language.

5. The method of claim 1, further comprising determining a language for the text, the determining includes:
   receiving a language selection stroke identifying the language.

6. The method of claim 1, further comprising:
   associating the one or more of the reading symbols for the language with the plurality of petal sensory portions, wherein the tones are associated with one petal sensory portion from the plurality of petal sensory portions.

7. A computer-readable storage medium having computer-executable instructions, that when executed, perform a method for inputting text to a computing system through a navigational interface including an input device, the method comprising:

receiving a selection stroke that begins on a central sensory portion of a sensor pattern of the navigational interface containing multiple sensory portions including the central sensory portion and a plurality of petal sensory portions;

displaying on a display reading symbols for a language, wherein the display comprises a central area and a periphery surrounding the central area, the periphery comprising a plurality of information elements each referencing a petal sensory portion of the plurality of petal sensory portions, the displaying comprising:

displaying consonants on the periphery;

after the consonants are displayed on the periphery and a user input is provided indicating that selection by a user of a consonant from the consonants is completed, displaying vowels and tones on the periphery by replacing the consonants with the vowels and tones; and after the vowels and tones are displayed on the periphery and a user input is provided indicating that selection by the user of at least one vowel of the vowels and a tone of the tones is completed, displaying one or more candidate characters in the language based on the selected tone and the selected consonant and at least one vowel; and receiving one or more selection strokes selecting one or more of the reading symbols and the tone, comprising:

while the consonants on the periphery are replaced with the vowels and tones, receiving at least one selection stroke of the one or more selection strokes selecting the at least one vowel of the vowels;

receiving a selection stroke of the one or more selection strokes selecting the tone of the tones; and while the vowels and tones on the periphery are replaced with the one or more candidate characters in the language generated based on the selected tone and the selected one or more of the reading symbols, displaying the selected tone and the selected one or more of the reading symbols on the central area of the display; and receiving a character selection stroke selecting a character from the one or more candidate characters.

8. The computer-readable storage medium of claim 7, further comprising:

displaying the one or more candidate characters on the periphery; and upon receiving the character selection stroke, inputting the character to the computing system.

9. The computer-readable storage medium of claim 7, wherein the one or more of the reading symbols include phonetic symbols for the language.

10. The computer-readable storage medium of claim 7, wherein the one or more of the reading symbols include sub-characters used for composing characters in the language.

11. The computer-readable storage medium of claim 7, wherein the method further comprises:

associating the one or more of the reading symbols for the language with the plurality of petal sensory portions.

12. A method for inputting text to a computing system through a navigational interface including an input device, the method comprising:

receiving a selection stroke that begins on a central sensory portion of a sensor pattern of the navigational interface containing multiple sensory portions including the central sensory portion and a plurality of petal sensory portions;

displaying on a display symbols corresponding to at least one language, wherein the display comprises a central area and a periphery surrounding the central area, the periphery comprising a plurality of information elements each referencing a petal sensory portion of the plurality of petal sensory portions;

selecting a symbol from the symbols, the symbol associated with a language from the at least one language;

displaying on a display a plurality of reading symbols associated with the language, the displaying comprising:

displaying consonants on the periphery;

after the consonants are displayed on the periphery and a user input is provided indicating that selection by a user of a consonant from the consonants is completed, displaying vowels and tones on the periphery by replacing the consonants with the vowels and tones; and after the vowels and tones are displayed on the periphery and a user input is provided indicating that selection by the user of at least one vowel of the vowels and a tone of the tones is completed, displaying one or more candidate characters in the language based on the selected tone and the selected consonant and the selected at least one vowel; and receiving selection strokes corresponding to reading symbols selected from the plurality of reading symbols and the tone, comprising:

selecting the consonant of the consonants;

while the consonants on the periphery are replaced with the vowels and tones, receiving at least one selection stroke of the one or more selection strokes selecting the at least one vowel of the vowels, and receiving a selection stroke of the one or more selection strokes selecting the tone of the tones; and while the vowels and tones on the periphery are replaced with the one or more candidate characters in the language generated based on the selected tone and the selected reading symbols, displaying the selected tone and the selected reading symbols on the central area of the display; and receiving a character selection stroke selecting the character from the one or more candidate characters.

* * * * *